United States Patent [19]
Pavelka

[11] 3,861,483
[45] Jan. 21, 1975

[54] TRACTOR HAVING A FULL SWIVEL FRONT SECTION

[76] Inventor: Clement C. Pavelka, 376 Orange Dr., Oxnard, Calif. 93030

[22] Filed: Apr. 26, 1974

[21] Appl. No.: 464,519

Related U.S. Application Data

[63] Continuation-in-part of Ser. No. 385,066, Aug. 2, 1972, Pat. No. 3,819,001.

[52] U.S. Cl. ................................ 180/19 S, 180/12
[51] Int. Cl. ............................................ B62d 51/04
[58] Field of Search ........ 180/19 S, 19 R, 19 H, 11, 180/12, 13, 6.66

[56] References Cited
UNITED STATES PATENTS

| | | | |
|---|---|---|---|
| 3,038,550 | 6/1962 | Lehmann et al. | 180/19 H |
| 3,154,162 | 10/1964 | McCaleb et al. | 180/6.66 |
| 3,370,666 | 2/1968 | Holtzclaw | 180/195 |
| 3,439,764 | 4/1969 | Kimball | 180/19 R X |

*Primary Examiner*—David Schonberg
*Assistant Examiner*—John A. Pekar
*Attorney, Agent, or Firm*—John E. Kelly; Pastoriza & Kelly

[57] ABSTRACT

A tractor has a mobile frame section carrying a hitch for connection with a mobile home or the like and a front section capable of being fully swivelled about its axis. Arching upwardly and forwardly from the mobile frame is a neck that is rigidly connected to a vertically disposed barrel which rotatably mounts a drum associated with the tractor front section. A columnar chassis extends from split axles and entirely through the drum so an upper part can support a motor and pivotally mount a steering mechanism. A differential gear assembly interconnects the split axles that extend from a pair of drive wheels. The steering mechanism is a U-shaped swing bar that can be maneuvered through a broad arc to clear the motor and other components while being swung from one side of the tractor to the other. During turning maneuvers by the tractor the differential gear assembly minimizes skidding and jerkiness tendencies.

10 Claims, 5 Drawing Figures

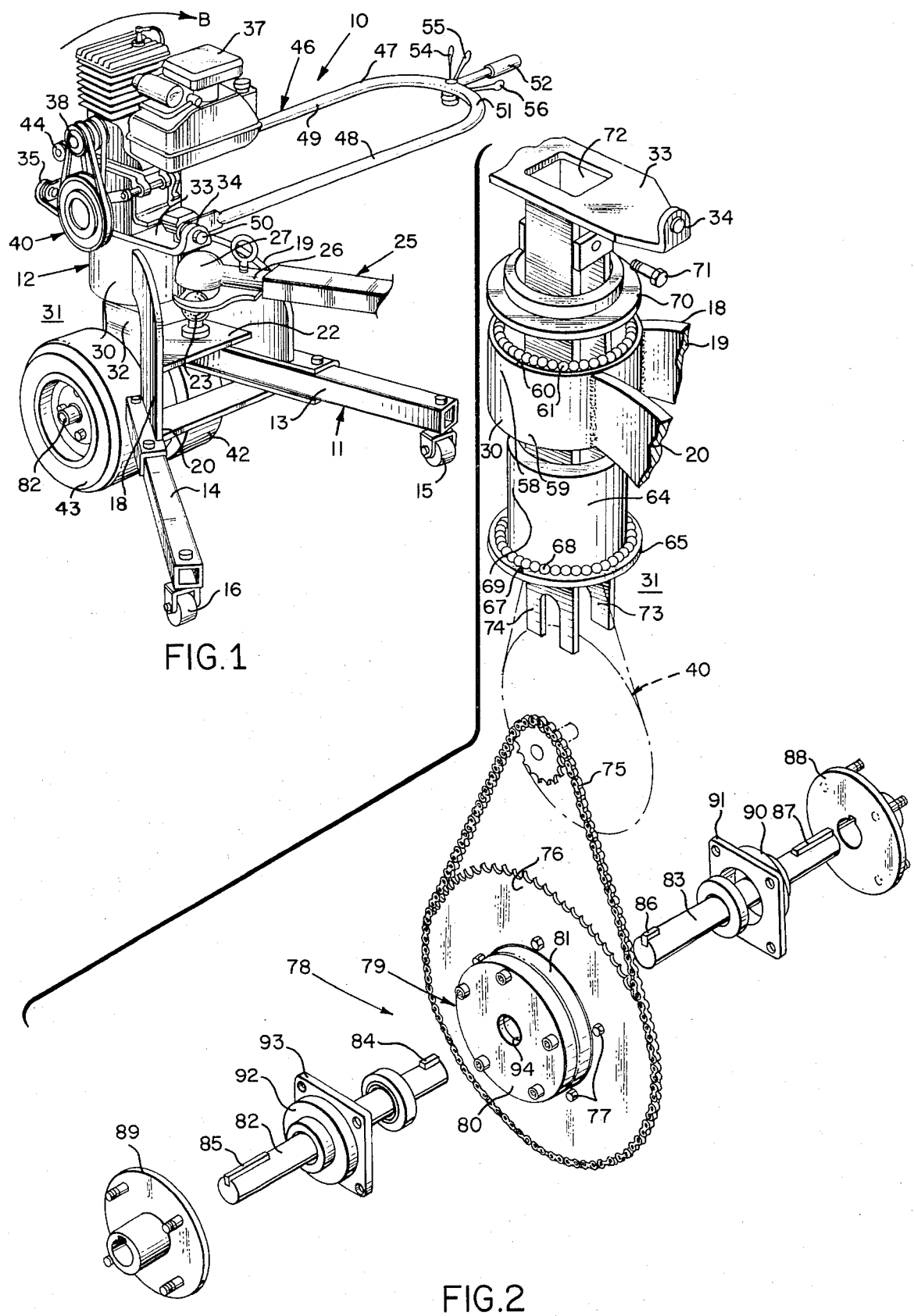

TRACTOR HAVING A FULL SWIVEL FRONT SECTION

This is a continuation-in-part application relative to pending U.S. utility application Ser. No. 385,066 filed Aug. 2, 1973, now Patent No. 3,819,001, by Clement C. Pavelka for a "Tractor With Full Swivel Front Section."

BACKGROUND OF THE INVENTION

This invention generally relates to tractors or dollies for towing heavy wheeled vehicles or objects and more specfically relates to a self-propelled tractor.

It is often desirable to relocate large vehicles such as mobile homes, aircraft, boat trailers, etc., from one nearby place to another.

This may be accomplished by towing them with a tractor or dolly of the type generally disclosed, for example, in U.S. Pat. No. 3,370,666 to Holtzclaw, et al., for a "Trailer Maneuvering Device;" U.S. Pat. No. 3,166,141 to Shields, et al., for a "Tractor," and U.S. Pat. No. 3,356,172 to Peckham, et al., for a "Motor Driven Dolly for Trailers."

Ideally a tractor should be self-powered, compact to operate within a small working area, easily maneuverable and versatile. Most tractors are not easily maneuverable and versatile and are commonly deficient in other requirements. In this regard, the steering mechanisms of conventional tractors are not capable of fully swivelling through 360° to negotiate difficult turns and facilitate the efforts of workmen.

The rare tractor which does have full rotation capability, e.g., U.S. Pat. No. 3,154,162 to McCaleb, et al., for a "Rotatable Prime Mover" is bulky which increases the risk of bumping into objects, and mechanically complex.

Smooth operation of conventional tractors especially during turning maneuvers is prevented because the wheels tend to skid and jerk with the inside wheel moving through a relatively short distance and the outside wheel moving through a relatively long distance.

SUMMARY OF THE INVENTION

Briefly stated, this invention relates to a tractor for towing vehicles and the like wherein a front section is capable of fully rotating about its axis and a differential gear assembly is included to accomplish smooth turning movements by the tractor.

In its broader aspects the tractor includes a customary mobile frame having a hitch for detachable engagement with a vehicle to be towed such as a mobile home, aircraft, boat trailer, etc.

An upright barrel is fixed to a front portion of the mobile frame in a manner so that the mobile frame and barrel together define a wheel maneuvering space located beneath the barrel and generally ahead of the mobile frame. A front section of the tractor includes a drum that is swivelly coupled to and disposed generally within the barrel in a manner so that the drum may be fully swivelled through 360° in either a clockwise or counterclockwise direction.

A chassis extends through and is coupled to the drum and has a top section which extends above the barrel and a bottom section that extends beneath the barrel and forms a pair of depending axle forks.

A steering mechanism is connected to either the motor or the chassis top section for use by a workman in maneuvering the tractor from one place to another. A pair of drive wheels are coupled to the chassis bottom section at a position fully beneath the barrel and drum and the wheels are sufficiently spaced from the mobile frame so that they may be fully turned through 360° within the wheel maneuvering space without contacting any portion of the mobile frame or other component of the tractor.

A pair of split axles extend from the pair of wheels. A differential gear assembly is mounted between the chassis bottom section forks and arranged to interconnect the pair of split axles in order to minimize skidding and jerkiness tendencies by the wheels during turning movements of the tractor.

Drive means operatively interconnects the motor and the drive wheels. Actuating means is operatively coupled to the drive means for selectively activating the drive means when the motor is in operation.

The differential gear assembly includes a first axle gear secured to one of the axles and a second axle gear secured to the other axle and aligned coaxially with the first axle gear. A casing has separable split sections that generally house the first and second axle gears and have interior walls shaped to define an annular chamber with the first and second axle gears.

Mating sets of bearing elements are positioned on the interior walls of the casing split sections and preferably are constituted by sockets formed in the interior walls of the casing split sections. A plurality of pairs of adjacent pins are journalled within and extend between these mating sets of bearing elements.

A plurality of pairs of spider gears are rotatably positioned on their corresponding pairs of adjacent pins. Each pair of spider gears is arranged with a first spider gear meshing engagement with the first axle gear and a second spider gear in meshing engagement with the second axle gear.

Rotation by one axle gear in a given direction and at a rate different than the normal rate associated with straight movement by the tractor automatically causes the pairs of spider gears to rotate the other axle gear at the same approximate rate but in the opposite direction — in order to minimize skidding and jerkiness tendencies that the tractor drive wheels would experience during turning movements.

The drive means includes a sprocket gear fixed to a casing split section and a drive chain wound around and drivingly engaged with the sprocket gear.

There are preferably three pairs of equiangularly spaced spider gears. The axles are preferably splined to the axle gears.

BRIEF DESCRIPTION OF THE DRAWINGS

The numerous benefits and unique aspects of the present invention will be fully understood when the following detailed description is studied in conjunction with the drawings in which:

FIG. 1 is a perspective view of a tractor constructed in accordance with this invention, showing the steering mechanism positioned at one side of the tractor and a socket connection of a mobile home or the like raised above the tractor hitch;

FIG. 2 is a perspective, fragmentary and exploded view showing the barrel and drum components and the columnar chassis extending entirely through the barrel and drum and also showing the differential gear assembly and associated split axles;

DETAILED DESCRIPTION OF THE PREFERRED EMBODIMENT

Figure 3:
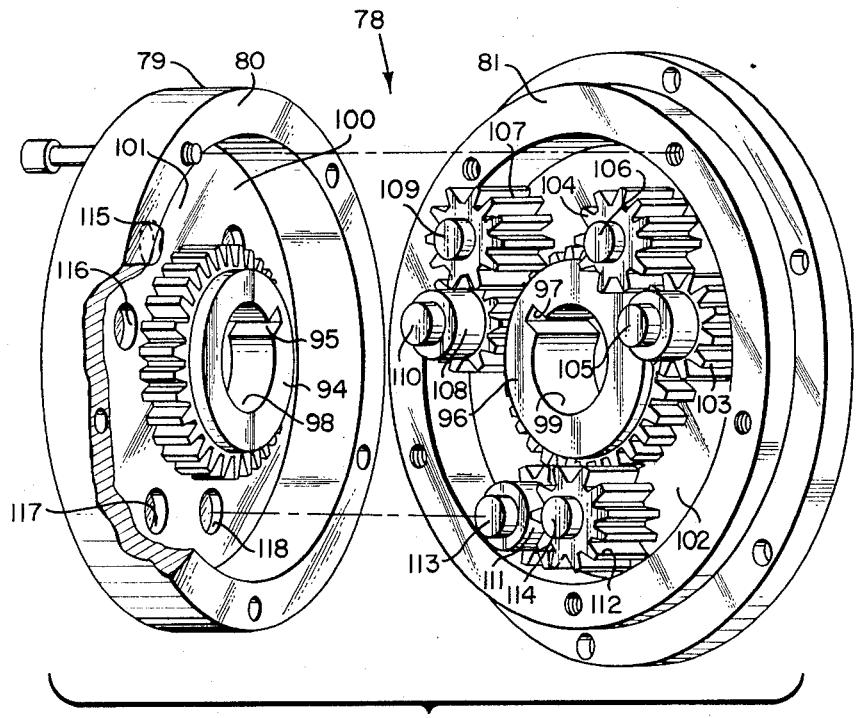
FIG. 3 is a perspective detailed view of the differential gear assembly showing the two separable sections opened in order to view the various internal gears; and, FIG. 4 is a longitudinal and partially sectional view between the dual wheels of the tractor; and, FIG. 5 is a side elevational fragmentary view, showing some of the gears and an axle fork in dotted lines.

Referring now to the detailed drawings and in particular FIG. 1, a tractor 10 is shown having a rear portion in the form of a mobile frame 11 and a fully rotatable front portion 12.

The mobile frame has a pair of load bearing stringers 13 and 14 that converge forwardly towards the tractor front portion 12. The stringers 13 and 14 are supported at their rearward points on rollers or casters 15 and 16 respectively.

A linking neck 18 has a pair of guard plates 19 and 20 which arch upwardly and project forwardly to assist in connecting the mobile frame rear portion 11 with the mobile frame front portion 12.

A cross bar or seat 22 interconnects the guard plates 19 and 20. A ball type hitch 23 is anchored to the center of seat 22. A mobile home, aircraft, boat trailer or any other type of vehicle is represented by numeral 25 which has a forwardly extending boom or draw rod 26. The end of draw rod 26 is equipped with a conventional socket joint 27 sized to fit over the ball hitch 23. The socket joint 27 is shown raised above the ball hitch 23 and they may selectively be releasably locked in a conventional manner.

The forward section of the linking neck 18 is rigidly secured to a generally upright barrel 30. The forward edges or ends of the guard plates 19 and 20 are fixed to the barrel 30 at different points for stability. A wheel maneuvering space 31 is generally defined by the barrel 30 and linking neck 18.

Extending entirely through the barrel 30 is an erect chassis 32, generally a hollow column in configuration, and terminating at its upper region in a flat and laterally extending platform 33. Diametrically opposed and outermost edges of the chassis platform 33 are bent into upturned flanges 34 and 35 to constitute pivot points for a steering mechanism 46.

Mounted on the chassis 32 is a conventional prime mover or motor 37 in the form of a gasoline engine having a power take-off shaft 38. The power take-off shaft 38 is coupled to a drive means 40 which includes conventional pulley system, drive belts, drive chains, etc., parts of which shall be more fully described. Drive means 40 is operatively coupled to a pair of drive wheels 42 and 43 that are spaced from one another for stability and to accommodate a differential gear assembly that shall be explained in detail.

An actuating means 44 is operatively coupled to the drive means 40 for selectively activating the drive means 40 when the motor 37 is operating. The steering mechanism 46 is linked to a chassis 32 and is generally constructed from a hollow U-shaped swing bar 47 having a pair of side arms 48 and 49 secured by pivot pins 50 to the chassis platform 33.

Extending outwardly from the center or cross arm 51 of the steering mechanism 46 is a handle 52 for use by the workman to manipulate and maneuver the tractor 10.

The swing bar side arms 48 and 49 are sufficiently long and spaced from one another so that the u-shaped swing bar 47 may be swung from one side of the tractor 10 to the other as indicated by directional arrow A without striking or encountering the motor 37, the drive means 40, actuating means 44 or any other part or component of the tractor front portion 12.

The actuating means 44 has a pair of clutches 54 and 55 mounted on the swing bar 47 at positions for convenient access by the workman for providing dual speed capability. Control cables and linkages extend through and along the side arms 48 and 49 to other parts of the actuating means 44 in operative engagement with the drive means 40. Similarly, a throttle handle 56 is mounted on swing bar 47 for controlling the motor 37.

The tractor front portion 12 is mounted relative to the tractor mobile frame 11 in such a way that the front portion 12 can be swivelled through a full 360° rotation either clockwise or counterclockwise as indicated by the directional arrow B. The coupling which makes this full rotation capability in either direction possible shall now be explained.

Referring now primarily to FIG. 2, the hollow chassis 32 is essentially a column of rectangular cross section. The laterally extending upper platform 33 is formed through a middle region with a space 72 through which portions of the drive means are disposed.

The vertically oriented barrel 30 has an upper part 58 and a lower part 59, both of which are formed with circular tracks for accommodating a plurality of round bearing elements. For purposes of example, barrel upper part 58 has a circular ball race 60 to assist in accommodating ball bearings 61.

A drum 64 is swively coupled to and disposed within the barrel 30 in such a manner that the drum 64 can be rotated freely through full clockwise or counterclockwise rotation. Drum 64 has a radially outwardly extending lower flange 65 formed with a circular ball race 67 for coacting with the ball race in barrel lower part 59 to accommodate ball bearings 68. A top part 69 of drum 64 is normally assembled with and covered by a separable bearing ring 70 that has a radially outwardly extending flange formed with a ball race to assist in holding the ball bearings 61. Various attachment holes and bolts 71 may be registered and coupled together in order to assemble these described components of the tractor 10.

The chassis 32 terminates at its lower end in a pair of laterally spaced mounting forks 73 and 74.

The drive means 40 incorporates components disposed within chassis 32 — including a drive chain 75 that is drivingly engaged with and drawn around a sprocket gear 76. A number of bolts 77 releasably secure the sprocket gear 76 to a differential gear assembly 78.

The differential gear assembly 78 includes an annular housing or casing 79 that is constructed from a pair of split half-sections 80 and 81. A pair of split axles 82 and 83 extend between the drive wheels 42 and 43 shown in FIG. 1 and casing 79. Locking elements in the form of splines 84 and 85 are attached to the inner and outer ends of axle 82. Similarly, locking elements in the form of splines 86 and 87 are secured to the inner and outer ends of axle 83.

The outer splines 85 and 87 aid in causing axles 82 and 83 to be drivingly engaged with a pair of hub brackets 88 and 89 that are normally secured to the drive wheels 42 and 43 shown in FIG. 1. A ball bearing unit 90 and mounting plate 91 serve to couple axle 83 to chassis fork 73. Similarly a symmetrical ball bearing unit 92 and mounting plate 93 aid in coupling axle 82 to the other chassis fork 74.

Referring primarily to FIG. 3 the differential gear assembly 78 is shown with the casing split sections 80 and 81 opened to show details of the internally disposed gears. Disposed within casing split section 80 is an axle gear 94 with a key way 95 which accepts spline 84. Disposed within the casing section 81 is a similar axle gear 96 with a key way 97 that accepts the inner spline 86 associated with axle 83.

An annular chamber 100 formed by the interior surfaces 100 and 102 of casing sections 80 and 81 together with the peripheries of axle gears 94 and 96 houses a plurality of pairs of spider gears. One pair of such spider gears 103 and 104 are arranged in mutual meshing engagement and are rotatably positioned on pivot pins 105 and 106 respectively. Spider gears 107 and 108 are arranged in mutually meshing engagement and are disposed on adjacent pivot pins 109 and 110 respectively. Another pair of spider gears 111 and 112 are rotatably disposed on adjacent pivot pins 113 and 114. The spider gears 103 107 and 111 are all arranged in meshing engagement with the axle gear 96. The other spider gears of these pairs of spider gears, i.e., gears 104, 107 and 112 are all interengaged with the other axle gear 94.

The pairs of axle gears are equiangularly spaced within the annular chamber 100. The six pivot pins are journalled at their opposing ends within bearing elements on the interior walls 101 and 102 of the casing split sections 80 and 81. More specifically the bearing elements are sockets. By way of illustration, sockets 115 and 116 rotatably receive pivot pins 109 and 110 respectively. Sockets 117 and 118 receive pivot pins 113 and 114, respectively.

Thus, each pair of spider gears is disposed so that a first spider gear is in meshing engagement with one axle gear and a second spider gear is arranged in meshing engagement with the other axle gear. By this arrangement, rotation by one of the axles in a given direction at a rate different than the normal travel speed of the tractor causes the various pairs of spider gears to rotate the other axle at the same approximate rate but in the opposite direction. This serves to minimize the skidding and jerkiness tendencies of the drive wheels 42 and 43 during turning maneuvers by the tractor 10.

Figure 4:
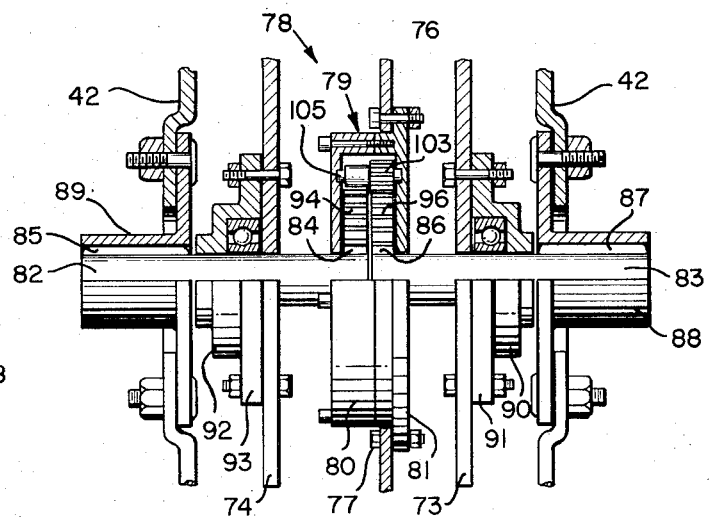

FIG. 4 is a longitudinal cross-sectional view taken through the axles 82 and 83 and differential gear assembly 78 showing the relative arrangements of the components when fully assembled for operation. The differential gear assembly 78 may be dismantled from the axles for repair and replacement and may be easily opened for access by separating the side sections 80 and 81 from one another. Similarly, the sprocket gear 76 may be easily unbolted from casing 79.

Figure 5:
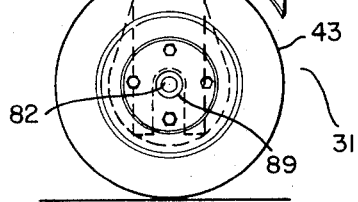

Referring to FIG. 5 axle 82 and its associated hub bracket 89 are shown partially projecting through the rim or mounting portion of the left drive wheel 43. The wheel maneuvering space 31, through which the dual drive wheels may be fully and freely rotated without encountering any other component of tractor 10, is represented by numeral 31.

OPERATION

Keeping this above construction in mind, it can be understood how previously described disadvantages of conventional towing devices are overcome or substantially eliminated by this invention.

A mobile home or other vehicle 25 may be attached to the tractor by way of coupling the detachable socket joint 27 to the ball type hitch 23 of mobile frame 11. After the motor 37 is activated, a single workman may then cause tractor 10 to tow the vehicle 25 to some desired new location. With the drive means 40 activated, the dual drive wheels 42 and 43 are caused to rotate at one of the two speeds selected and dictated by clutch hand levers 54 and 55 associated with the actuating means 44. The tractor 10 may be caused to travel at relatively low speed or relatively high speed.

If space limitation or obstacles require sharp turning maneuvers or quick directional reversals, the workman can handle these requirements or situations as they arise. He has great flexibility in controlling the performance of tractor 10 and is prepared to negotiate the tractor 10 through abrupt directional changes.

During turning maneuvers by tractor 10, either sharp or gentle, the drive wheels 42 and 43 travel smoothly as a result of the differential gear assembly 78. The ordinary tendencies towards intermittent jerkiness and rough handling as a result of the inner wheel travelling through a short arc of distance and the outer wheel travelling through a relatively long arc of distance is essentially eliminated. During turns the pairs of spider gears function to make rotational movements of the axles compatible with one another. As the inner axle slows down rotation of the inner drive wheel then the outer axle simultaneously speeds up rotation of the outer drive wheel.

During maneuvering of the tractor the workman may swing the entire steering mechanism 46 over the motor 37 from left to right or vice versa and then continue to steer the tractor 10 from the opposite side. Importantly, the tractor front portion 12 can be rotated through a full range of angular movements because of the full swivel connection between barrel 30 and drum 64, which allows the tractor front portion 12 to be spun through 360° in either direction relative to its own axis and relative to the fixed position of the tractor mobile frame 11.

Inasmuch as the major portion of the drive means 40 is confined within and generally packaged by the chassis 32 and barrel 30 — this is a safety factor minimizing the risk that the workman or some object might become caught in or on the gearing.

From the foregoing it will be evident that the present invention has provided a tractor with full swivel capability and an associated differential gear assembly in which all of the various advantages are fully realized.

What is claimed is:

1. A tractor having a full swivel front section, comprising:
   a. a mobile frame with a hitch for detachable engagement with a vehicle to be towed;
   b. an upright barrel fixed to a front portion of the mobile frame, the mobile frame and barrel defining a wheel maneuvering space beneath the barrel and ahead of the mobile frame;

c. a drum swivelly coupled to and disposed within the barrel for full 360° clockwise and counter-clockwise rotation;
d. a chassis extending through and coupled to the drum, the chassis having a top section extending above the barrel and a bottom section forming a pair of depending forks that extend beneath the barrel;
e. a motor coupled to the chassis top section;
f. a steering mechanism connected to the motor or chassis top section for maneuvering the tractor;
g. a pair of drive wheels coupled to the chassis bottom section fully beneath the barrel and drum and sufficiently spaced from the mobile frame so that the drive wheels may be fully turned through 360° within the wheel maneuvering space without contacting the mobile frame;
h. a pair of axles secured to the wheels;
i. a differential gear assembly between the chassis bottom section forks and arranged to interconnect the pair of axles for minimizing skidding and jerkiness tendencies of the wheels during turning movements of the tractor;
j. drive means operatively interconnecting the motor and drive wheels and,
k. actuating means operatively coupled to the drive means for selectively activating the drive means when the motor is in operation.

2. The structure according to claim 1, wherein the differential gear assembly includes:
a. a first axle gear secured to one of the axles;
b. a second axle gear secured to the other axle and aligned coaxially with the first axle gear;
c. a casing with separable split sections that generally house the first and second axle gears and whose interior walls define an annular chamber with the first and second axle gears;
d. mating sets of bearing elements on the interior walls of the casing split sections;
e. a plurality of pairs of adjacent pins journalled within and extending between the mating sets of bearing elements; and,
f. a plurality of pairs of spider gears rotatably positioned on corresponding pairs of adjacent pins, each pair being arranged with a first spider gear in meshing engagement with the first axle gear and a second spider gear in meshing engagement with the second axle gear.

3. The structure according to claim 2, wherein:
a. the chassis is generally a hollow column;
b. the chassis top section is formed with a space above the drum; and,
c. a portion of the drive means extends through the space and is generally surrounded by the chassis.

4. The structure according to claim 3, wherein the drive means includes:
a. a sprocket gear fixed to a casing split section; and,
b. a drive chain wound around and drivingly engaged with the sprocket gear.

5. The structure according to claim 2, wherein:
the drive means is constructed to have dual speed capability.

6. The structure according to claim 2, wherein the plurality of pairs of spider gears includes:
three pairs of equiangularly spaced spider gears.

7. The structure according to claim 2, wherein:
a. one end of the drum is formed with a radially outwardly extending flange that coacts with the corresponding end of the barrel in defining a first circular track for a plurality of round bearing elements; and,
b. the other end of the drum includes a separable ring that coacts with the corresponding ends of the barrel in defining a second circular track for a plurality of round bearing elements.

8. The structure according to claim 7, wherein:
a. the separable ring fully surrounds and is connected to the chassis.

9. The structure according to claim 2 wherein:
the chassis top section has a platform which pivotally mounts the steering mechanism.

10. The structure according to claim 9 wherein the steering mechanism includes:
a. a U-shaped swing bar pivotally connected by its side arms to the chassis at points on opposite sides of the motor, the side arms being sufficiently long and spaced from one another to clear the motor and enable the swing bar to be swung over the motor from one side to the other.

* * * * *